April 7, 1959 W. RABUS 2,881,357
PROTECTIVE DEVICE FOR HIGH TENSION TRANSMISSION LINES
Filed Sept. 3, 1957 3 Sheets-Sheet 1
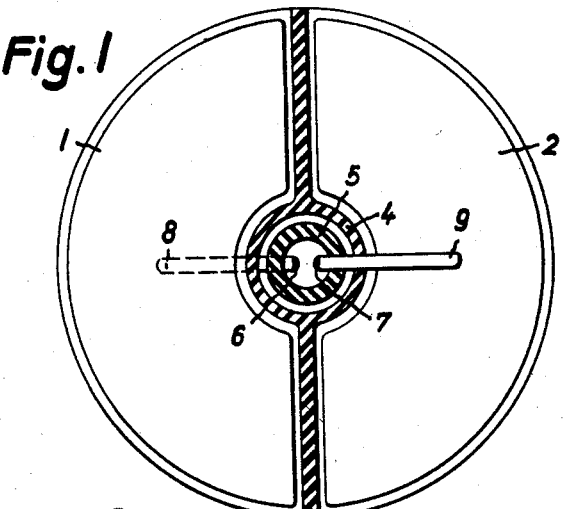
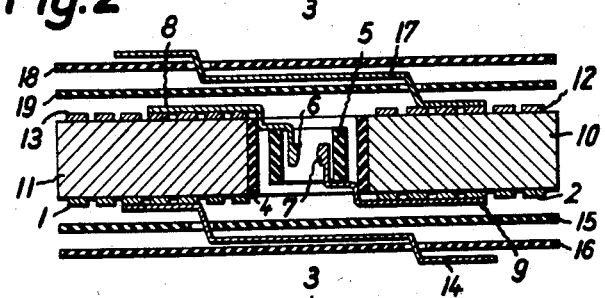
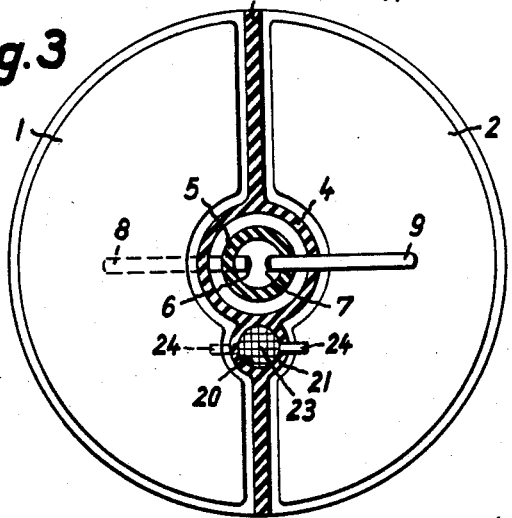
Inventor:
WILLY RABUS
BY Toulmin & Toulmin
ATTORNEYS

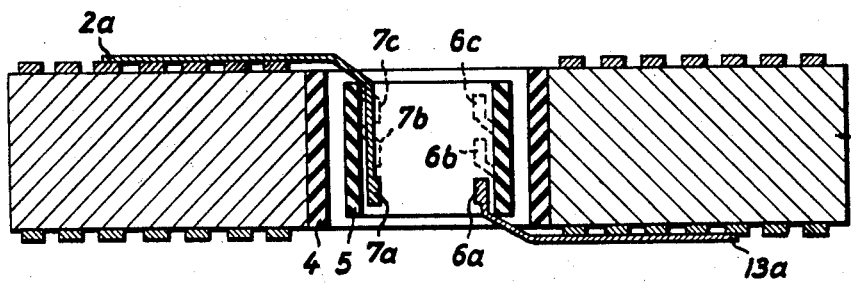
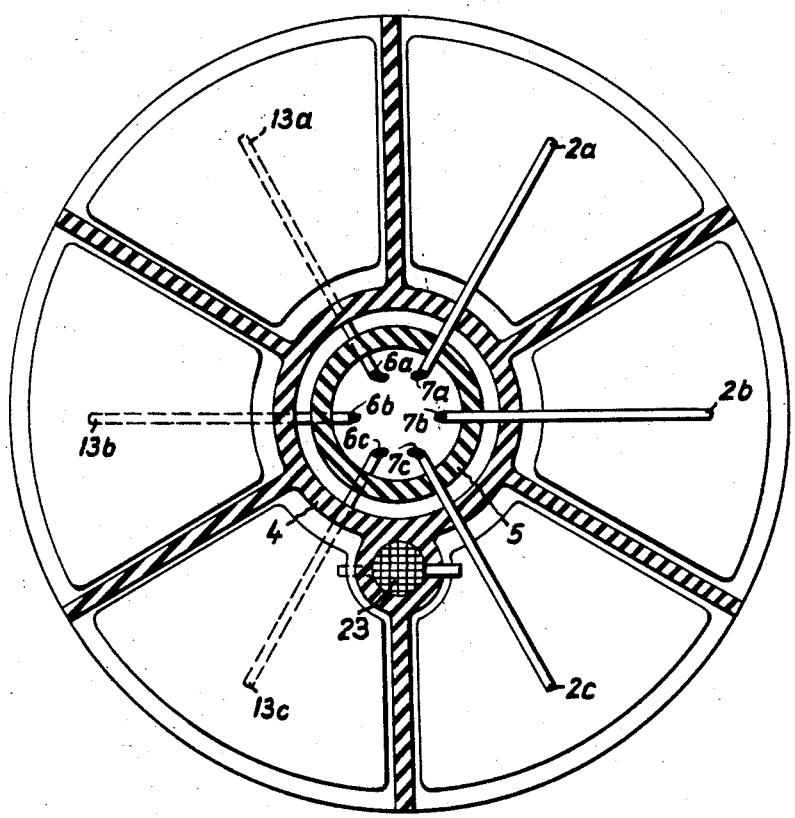

United States Patent Office 2,881,357
Patented Apr. 7, 1959

2,881,357

PROTECTIVE DEVICE FOR HIGH TENSION TRANSMISSION LINES

Willy Rabus, Stuttgart-Unterturkheim, Germany

Application September 3, 1957, Serial No. 681,811

Claims priority, application Germany September 3, 1956

12 Claims. (Cl. 315—36)

The present invention relates to protective devices for insulators and associated apparatus in high tension power transmission lines. More particularly, the present invention relates to lightning arrestors, comprising a voltage dependent current limiting resistance and a quench gap.

Heavy excess voltage and in particular heavy arcs cause a serious problem to the maintenance of high tension power transmission lines. Especially, damage to the insulators and an outing of the line must be prevented. There have been several devices developed to eliminate the dangers of excess voltages and particularly heavy arcs. Arresters with a current limiting element and a quench gap offer one of the best solutions to these problems; but have, especially for high voltage, the disadvantage that they require a space considerably exceeding the size of the insulators with which they are associated. It has already been suggested to reduce the overall size of protective devices of the nature indicated by dividing the resistance element (usually a disk shaped resistance) composing the voltage dependent current limiting resistance into a number of adjacent resistance portions which are switched in series. Usually these resistance disks are divided into two portions and as a result the size of the assembly of resistance elements can be reduced to approximately half the size of an assembly of undivided resistance elements and accordingly the overall size of the entire protective device is correspondingly reduced. The reduction in size of the entire protective device, however, does not correspond to the reduction in size of the assembly of power resistance elements since the unreduced size of the quench gap has to be added to the reduced size of the tension dependent resistance elements in order to obtain a complete protective device of the expulsion tube type. As a result, even these more progressive designs of the protective devices still greatly exceed the size of the insulators, for example pin type insulators, with which they are associated. This is especially so in the case of protective devices for extra high tension power transmisison lines.

It is an object of the present invention to provide a protective device for insulators in high tension power transmission line of the type comprising a voltage dependent current limiting resistance and a quench gap, which has a drastically reduced overall size compared to known devices.

It is another object of the present invention to provide a protective device for insulators in high tension power transmisison lines of the type comprising a voltage dependent current limiting resistance and a quench gap which has a considerably increased excess voltage extinguishing capacity.

These objects are achieved by the protective device for insulators in high tension power transmission lines of the type comprising a voltage dependent current limiting resistance and a quench gap, in which the resistance bodies are subdivided into a plurality of portions by means of an insulating bridge and wherein the resistance bodies are provided with a central boring in which there is arranged the quench gap. A number of such resistance elements can be assembled to a composite protective device of correspondingly increased protective capacity. In this composite device the individual resistance elements are connected in series via the quench gaps whenever the protective device is actuated by an excess voltage.

According to another, preferred embodiment of the present invention, the resistance bodies are provided each with a plurality of contact surfaces each of which is connected with a separate quench gap in the central boring of the corresponding resistance body.

The present invention will be better understood upon the following detailed description of the accompanying drawings, wherein—

Figure 1 is a top view of one of the several resistance elements of which the protective device of the invention is composed;

Figure 2 is a cross-sectional view of the resistance element shown in Figure 1;

Figure 3 is a top view of another embodiment of a resistance element of the protective device of the present invention;

Figure 5 is a cross-sectional view of a preferred embodiment of a resistance element of the invention having a plurality of quench gaps;

Figure 6 is a plan view of the preferred embodiment of the resistance element of the invention shown in Figure 5.

Figure 4:
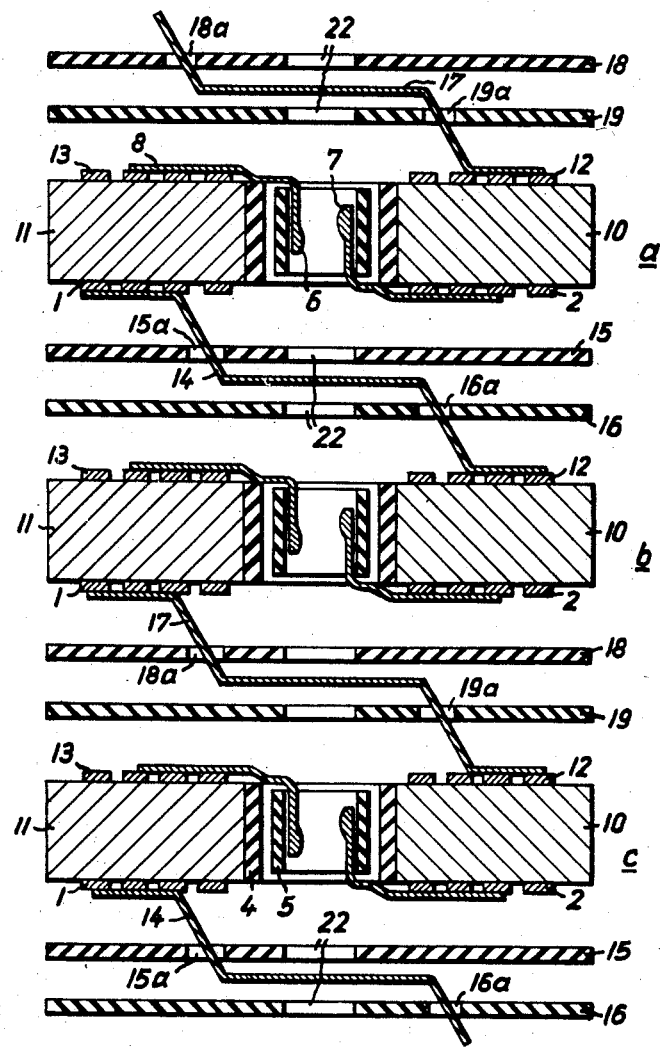
Figure 4 is a cross-sectional view of an assembly of several resistance elements of the invention.

The protective device of the present invention is composed of a plurality of identical resistance elements, of which three resistance elements $a$, $b$, $c$, are shown in Figure 4. Each of these resistance elements is composed of two portions 1 and 2. These portions 1 and 2 are provided with a contact lining 1a and 2a and they are insulated from each other by a central insulating bridge 3. Underneath the contact linings 1a and 2a, respectively, of the resistance disk portions 1 and 2 there are the active portions 10 and 11 (see Figure 2). The resistance disk is provided with a central boring defined by the half-moon shaped edges 1b of the disk portion 1 and 2b of the disk portion 2. Within this central circular boring defined by the edges 1b and 2b there is arranged an insulating jacket, for instance the insulating bush 4 which forms an integral portion with the insulating bridge 3, and is the central portion thereof. Inside the cylindrical space confined by the insulating bush 4 there is arranged the insulating ring 5. The two electrodes 6 and 7 are attached to this insulating ring 5 and protrude into the cylindrical hollow space enclosed by this insulating ring. The two electrodes 6 and 7 are connected with the contact linings 2 and 13 upon the resistance disk via the connections 8 and 9. The discharge current is conducted to contact lining 1 via the current conductive strip 14 connecting the resistance disk to the next adjoining resistance element or to the terminal. Below the resistance disk there are arranged two insulating disks 15 and 16. The current conductive strip 14 is led through these disks 15 and 16 through openings 15a and 16a. On the other side of the resistance disk, the discharge current is conducted from the contact lining 12 of the resistance disk via the current conductive strip 17 to the next resistance element arranged on this side of the resistance disk or to the terminal. Again, there are arranged on this side of the resistance disk two insulating disks 18 and 19 and the current conductive strip 17 is led through these insulating disks through holes 18a and 19a provided in these disks. The current conductive strips 14 and 17 are arranged above and below the resistance disk, respectively, in a position laterally relative to the central axis of the disk and not vertically above the center of the disk so as to leave a free passage through the borings in the resistance disk defined by the ring 5 and corresponding borings in the insulating disks 15, 16, 18 and 19 arranged centrally above and below, respectively, the boring in the resistance disk confined by the ring 5. If several resistance disks are assembled, these various borings are arranged centrally and vertically above and below each other so as to obtain a cylindrical space in which the quenching gaps of the various resistance elements are arranged. This makes it possible that the quench gaps of the various resistance elements are exposed to each other and consequently the various quench gaps of the lightning arrester are quickly and reliably actuated by an excess voltage. The resistance disk and the corresponding quench gap are preferably so adjusted to each other that they cooperate to form an independent protective unit of a certain rated voltage. Several of such units can then be assembled and switched in series so as to constitute a lightning arrester of a correspondingly increased rated voltage.

According to another embodiment of the present invention, the individual protective units which are assembled to form a composite lightning arrester are provided with means causing a linear distribution upon the quench gaps of the various units of an A.C. voltage having mains or mean frequency. These means may consist of a control resistance 22 being dependent upon the voltage or independent therefrom, which control resistance bridges the quench gap of each individual unit.

In order to facilitate the assembly of the individual resistance disk with their respective borings to a lightning arrester, it is of advantage to provide the various resistance disks with an additional boring 20 (see Figure 3) pressed into the disk and provided with an insulating bush 21. The control resistance 22 is positioned in this boring 20, which latter is provided with the insulating bush 21 and in the assembled disks the various control resistances are thus arranged parallel to the various quench gaps.

It is also possible to provide an insulating ring fulfilling both the function of the insulating ring 5 and the control resistance 22.

According to another, preferred embodiment of the present invention, the protective capacity of the protective device of the lightning arrester of the present invention can be further increased by subdividing the contact surfaces 13 and 2 into a plurality of two or more contact surfaces of equal size and separated from each other, as for instance the contact surfaces 13a, 13b, 13c and 2a, 2b, 2c. Each of these partial contact surfaces 13a, 13b, 13c are connected with the corresponding partial surfaces 2a, 2b, 2c via a separate quench gap, and electrodes 6a, 6b, 6c and 7a, 7b, 7c, respectively. These quench gaps are arranged within the insulating ring 5 and are insulated from each other, for example by insulating rings 5a and 5b. Since the several quench gaps arranged adjacent to one another are simultaneously alive, the load applied to each quench gap is correspondingly reduced in comparison to an arrangement with only one single quench gap.

While the contact surfaces 13 and 2 are preferably subdivided into a plurality of partial contact surfaces it is advisable not to subdivide the contact surfaces 1 and 12, because it is then sufficient to bridge only one of the several quench gaps with a control resistance 23.

It will be understood that this invention is susceptible to modification in order to adapt it to different usages and conditions, and, accordingly, it is desired to comprehend such modifications within this invention as may fall within the scope of the appended claims.

What I claim is:

1. A lightning arrester for insulators of high tension power transmission lines and associated apparatus comprising, in combination, a plurality of voltage dependent current limiting resistance elements having a central boring and a quench gap disposed in said central boring, an insulating bridge, resistance elements comprising a first and a second resistance portion disposed in one plane and separated from each other by said insulating bridge, said first and said second portions of said resistance elements being connected in series via said quench gap whenever the lightning arrester is actuated.

2. A lightning arrester for insulators of high tension power transmission lines and associated apparatus comprising, in combination, a plurality of voltage dependent current limiting resistance elements having a central boring and a quench gap disposed in said central boring, said resistance elements each comprising a first and a second resistance portion disposed in one plane, said first and second portions of said resistance elements being connected in series with said quench gap whenever the lightning arrester is actuated, an insulating bridge separating said first and second resistance portion, and an insulating jacket within said boring of said resistance elements and surrounding said quench gap.

3. A lightning arrester for insulators of high tension power transmission lines and associated apparatus comprising, in combination, a plurality of voltage dependent current limiting resistance elements having a central boring and a quench gap disposed in said central boring, said resistance elements each comprising a first and a second resistance portion disposed in one plane, said first and second portions of said resistance elements being connected in series with said quench gap whenever the lightning arrester is actuated, an insulating bridge separating said first and second resistance portion, an insulating jacket within said boring of said resistance elements, and an insulating ring within said insulating jacket and surrounding said quench gap.

4. A lightning arrester for insulators of high tension power transmission lines and associated apparatus comprising, in combination, a plurality of voltage dependent current limiting resistance elements having a central boring and a quench gap disposed in said central boring, an insulating bridge, resistance elements comprising a first and a second resistance portion disposed in one plane and separated from each other by said insulating bridge, a plurality of current conductive strips intereconnecting said resistance elements in series.

5. A lightning arrester for insulators of high tension power transmission lines and associated apparatus comprising, in combination, a plurality of voltage dependent current limiting resistance elements having a central boring and a quench gap disposed in said central boring, an insulating bridge, resistance elements comprising a first and a second resistance portion disposed in one plane and separated from each other by said insulating bridge, a plurality of current conductive strips interconnecting said resistance elements in series, further comprising a plurality of insulating disks interposed between said resistance elements.

6. A lightning arrester for insulators of high tension power transmission lines and associated apparatus comprising, in combination, a plurality of voltage dependent current limiting resistance elements having a central boring and a quench gap disposed in said central boring, an insulating bridge, resistance elements comprising a first and a second resistance portion disposed in one plane and separated from each other by said insulating bridge, a plurality of current conductive strips interconnecting said resistance elements in series, further comprising a plurality of insulating disks interposed between said resistance elements, and having openings in the area adjoining said quench gaps in said resistance elements, said quench gaps thus being exposed to each other.

7. A lightning arrester for insulators of high tension power transmission lines and associated apparatus comprising, in combination, a plurality of voltage dependent current limiting resistance elements having a central boring and a quench gap disposed in said central boring, said resistance elements each comprising a first and a second resistance portion disposed in one plane, said first and second portions of said resistance elements being connected in series with said quench gap whenever the lightning arrester is actuated, an insulating bridge separating said first and second resistance portion, an insulating jacket within said boring of said resistance elements, an insulating ring within said insulating jacket and surrounding said quench gap, and a plurality of control resistances bridging said quench gaps.

8. A lightning arrester as defined in claim 1 further comprising a plurality of contact surfaces of equal size and separated from each other.

9. A lightning arrester as defined in claim 1 further comprising a plurality of contact surfaces of equal size and separated from each other, and a plurality of quench gaps each being connected with one of said contact surfaces.

10. A lightning arrester as defined in claim 1 further comprising a plurality of contact surfaces of equal size and separated from each other, a plurality of quench gaps each being connected with one of said contact surfaces, and a control resistance bridging one of said quench gaps.

11. A lightning arrester for insulators of high tension power transmission lines and associated apparatus comprising, in combination, a plurality of voltage dependent current limiting resistance elements having a central boring and a quench gap disposed in said central boring, said resistance elements each comprising a first and a second resistance portion disposed in one plane, said first and second portions of said resistance elements being connected in series with said quench gap whenever the lightning arrester is actuated, an insulating bridge separating said first and rescond resistance portion, an insulating jacket within said boring of said resistance elements, an insulating ring within said insulating jacket and surrounding said quench gap, said resistance elements each having a second boring, and a control resistance in said second boring and bridging said quench gap.

12. A lightning arrester for insulators of high tension power transmission lines and associated apparatus comprising, in combination, a plurality of voltage dependent current limiting resistance elements having a central boring and a quench gap disposed in said central boring, said resistance elements each comprising a first and a second resistance portion disposed in one plane, said first and second portions of said resistance elements being connected in series with said quench gap whenever the lightning arrester is actuated, an insulating bridge separating said first and second resistance portion, an insulating jacket within said boring of said resistance elements, an insulating ring within said insulating jacket and surrounding said quench gap disposed within said insulating ring, said resistance elements each having a second boring, an insulating bush in said second boring and a control resistance in said insulating bush bridging said quench gap.

References Cited in the file of this patent

UNITED STATES PATENTS

| | | |
|---|---|---|
| 2,392,679 | McCarthy | Jan 8, 1946 |
| 2,495,154 | Zimmerman | Jan. 17, 1950 |
| 2,703,852 | Meador | Mar. 8, 1955 |